United States Patent
Snedeker

[15] 3,659,182
[45] Apr. 25, 1972

[54] BATTERY CHARGING SYSTEM WITH REVERSE BATTERY PROTECTION

[72] Inventor: Marion L. Snedeker, Cleveland, Ohio
[73] Assignee: VLN Corporation, Cleveland, Ohio
[22] Filed: Sept. 3, 1970
[21] Appl. No.: 69,253

[52] U.S. Cl. ............................................. 320/25, 307/127
[51] Int. Cl. ............................................................ H02j 7/00
[58] Field of Search ..................... 307/127, 314; 320/25, 26

[56] References Cited

UNITED STATES PATENTS

| | | | |
|---|---|---|---|
| 3,398,347 | 8/1968 | Citro | 320/25 |
| 3,365,645 | 1/1968 | Jacobs | 320/25 |
| 3,346,802 | 10/1967 | Biet | 307/314 X |
| 3,348,121 | 10/1967 | Murthy | 317/33 SC |
| 3,427,528 | 2/1969 | Custer | 320/DIG.2 |
| 3,524,078 | 8/1970 | Harris | 307/314 X |

*Primary Examiner*—William M. Shoop, Jr.
*Attorney*—Yount & Tarolli

[57] ABSTRACT

A circuit prevents a generating machine from being operatively connected to a battery whenever the battery has been connected with a reverse polarity. The machine is coupled through the anode-cathode path of a silicon-controlled rectifier to the battery and the rectifier is switched on in response to current pulses in the field winding of the machine. A primary winding of a pulse transformer and the secondary winding of the pulse transformer are employed to supply gating pulses to the controlled rectifier. The transformer has a saturating winding which is energized when the battery is connected in a reverse direction so that no gating pulses are coupled through the transformer to the gate of the controlled rectifier to turn on the controlled rectifier.

15 Claims, 1 Drawing Figure

Patented April 25, 1972
3,659,182
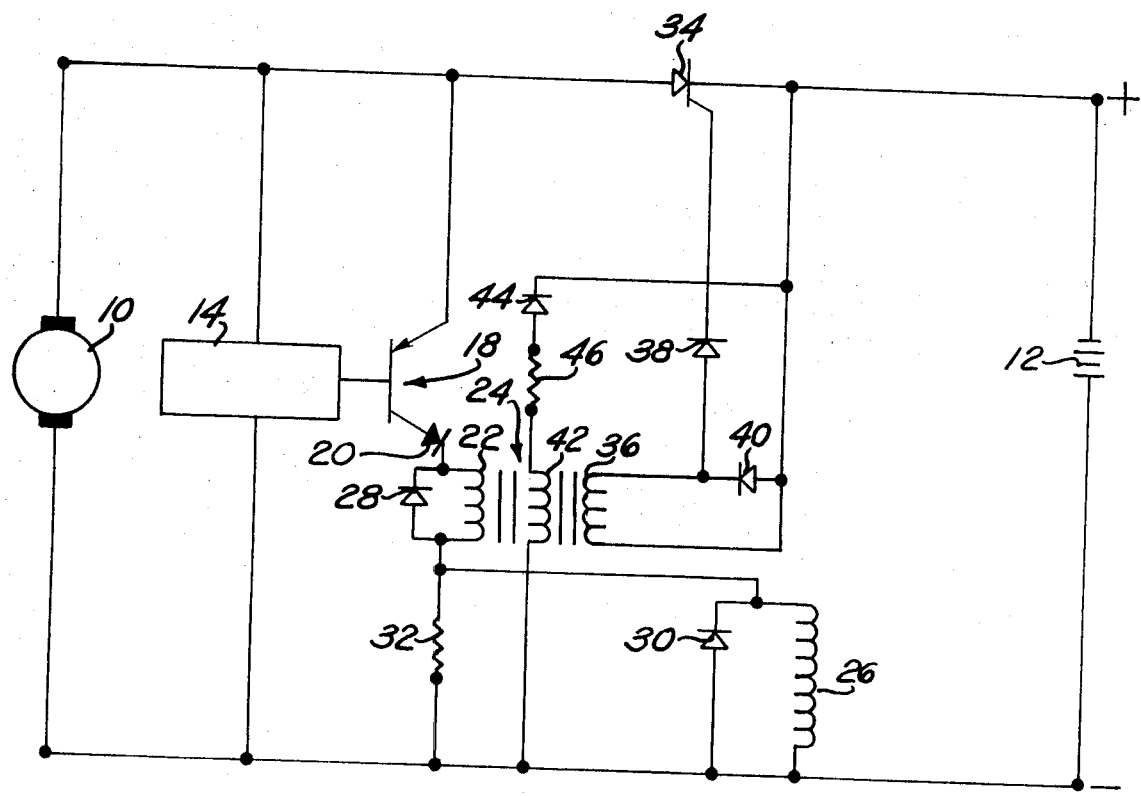
INVENTOR
MARION L. SNEDEKER
BY Yount and Tarolli
ATTORNEYS

BATTERY CHARGING SYSTEM WITH REVERSE BATTERY PROTECTION

Automotive or other storage batteries charged from a generating machine may be inadvertently connected with a reverse polarity.

It is an object of the present invention to provide a new and improved polarity reversal protective circuit in which a generating machine is connected to a battery through a gate device which is activated directly in response to current pulses in the field of the machine.

Another object of the present invention is to provide a new and improved electrical circuit for operatively connecting a voltage generator means having a field winding with a D.C. voltage source in which the field current in the generator means is sensed and used to control the connection of the voltage generating means to the D.C. voltage source and in which the field current is rendered ineffective to effect the connection of the generating machine to the battery with a reversed battery.

A further object of the present invention is to provide a new and improved control system for connecting a generating machine to a battery to be charged in which signals are normally transmitted by a transformer to connect the output of the machine to the battery when the machine starts operating, the transformer being saturated in the event the battery is inserted with reverse polarity to prevent connection of the generating machine to the battery.

Other objects and advantages of the present invention will be apparent from the following description and the drawing.

The FIGURE is a schematic representation of a specific embodiment of the preferred circuit arrangement embodying the present invention.

In the illustrated embodiment, a direct current generator 10 having a field winding 26 is employed to charge a battery 12. A regulator including a voltage sensing circuit 14 and an output transistor 18 is utilized to control the current in the field circuit of the generator 10 to provide a substantially constant voltage to the battery 12. The regulator is a conventional transistorized regulator circuit which supplies a signal to the base of the PNP transistor 18 to switch the transistor off and on as the generator output voltage rises and falls to predetermined levels to turn the field current for the generator on and off to maintain a substantially constant output voltage from the generator. The field circuit is through the collector-emitter path of the transistor 18 and includes a diode 20, the primary winding 22 of a transformer 24, and a field winding 26 of the generator 10. During normal operation, the field current is switched on and off at a relatively rapid rate. A diode 28 which is coupled across the primary winding 22 of the transformer 24 and a diode 30 which is coupled across the field winding 26 of the generator 10 are "free wheeling" or "field discharge" diodes and act to shunt their respective windings when the transistor 18 is turned "off" and the respective magnetic fields in the windings collapse. A resistor 32 is connected in the circuit between the primary winding 22 of the transformer 24 and the normally negative side of the system. Resistor 32 limits the magnitude of current flowing through winding 22 to a safe value.

A controlled rectifier 34, which preferably is a silicon-controlled recitfier, has its anode-cathode path coupled between the positive terminal of the battery 12 and the positive output terminal of the generator 10 and functions as a switch for preventing reverse battery current when the generator is not operating or operating at a low voltage output. The gate of the silicon-controlled rectifier 34 controls the operation of the switch and the gate-cathode circuit of SCR 34 is connected in a series circuit with the secondary winding 36 of transformer 24. When the battery 12 is connected with the correct polarity, as shown in the figure, pulses in the field circuit induce gating pulses in the secondary winding 36 of the transformer 24 to apply positive pulses between the gate and cathode of the SCR 34. Thus, the gate will be rendered positive with respect to the cathode of SCR 34 and the pulses will render the SCR 34 conductive when the generator 10 is operating and current pulses are established in the field. The SCR will not be turned on by the pulses until the output of the generator is high enough to render the anode of the SCR positive with respect to the cathode. A pair of diodes 38 and 40 are associated with the gate of the SCR 34 and winding 36 so that positive voltage pulses are coupled to the gate of the SCR 34 through diode 38 and negative pulses are shorted by the diode 40.

The primary winding 22 and the secondary winding 36 of the transformer 24 and the third winding, or control winding 42, are all wound on the same transformer core. When the battery 12 is connected with a polarity shown in the figure, the diode 44 which has its cathode connected to the positive terminal of the battery 12 will be reverse biased and no current will flow through the diode 44, the resistor 46 or the control winding 42. Thus, the control pulses which are supplied by the transistor 18 to the primary winding 22 of the transformer 24 will be coupled through the secondary winding 36 of the transformer 24 where they will be supplied as gating pulses to the gate of the controlled rectifier 34.

When the battery 12 is connected in the reverse direction with its negative terminal connected to the cathode of the controlled rectifier 34, the diode 44 will be forward biased and current will flow through the control winding 42, the resistor 46 and the diode 44. The current magnitude may be controlled by the value of the resistor 46 so that the core of the transformer 24 on which the windings 22, 36 and 42 are all wound will be saturated. When the core of the transformer 24 is saturated, control pulses from the transistor 18 will no longer be coupled from the primary winding 22 to the secondary winding 36 of the transformer 24 and the controlled rectifier 34 cannot be gated on. When the core of the transformer 24 is saturated, no voltage will be induced into the secondary winding 36 by the field current. Thus, gating pulses of the proper polarity will not be applied to the SCR 34 and the SCR 34 will not conduct. When the SCR 34 does not conduct, the generator 10 will be essentially isolated from the battery 12 and no destructive current will flow from the battery to the generator 10.

From the foregoing, it should be apparent that a new and improved circuitry has been provided to prevent a generating machine from being operatively connected with the battery when the polarity of the battery is reversed. Although the present invention has been described with reference to a particular embodiment, it will be obvious to those skilled in the art that various other modifications, such as the replacement of the generator with an alternator, may be employed in the scope of the present invention.

What is claimed is:

1. In a generating system comprising a generating machine including a field circuit comprising a field winding and electrical connections for connecting a battery to be charged by said generating machine to said machine, said connections including switching means having first and second conditions for respectively electrically connecting and disconnecting said generating machine to and from said battery, said switching means requiring a predetermined electrical signal for actuation from its first condition to its second condition, second means for providing said electrical signal when said generating machine is generating an output comprising a transformer having a primary winding connected to said generating machine to be energized with a current which changes in a pulsing manner when said generating machine is operating and a secondary winding connected to said switching means to provide said predetermined signal in response to a predetermined pulsing change in said current, and third means responsive to reverse battery polarity for saturating said transformer to prevent current in said primary winding from inducing currents in said secondary winding to provide said predetermined signal.

2. In a generating system as defined in claim 1 wherein said generating machine is a machine which generates a direct current.

3. In a generating system as defined in claim 16 wherein said primary winding is connected into the field circuit of said generating machine.

4. In a generating system as defined in claim 3 wherein said switching means is a controlled rectifier and said secondary winding is connected to provide gate signals to said rectifier.

5. In a generating system as defined in claim 3 wherein said system includes a voltage regulator for regulating the output of said generating machine by controlling the current in said field winding in response to said output, said regulating means switching off and on as the output of said generating machine rises and falls to predetermined levels to provide said current which pulses in a predetermined manner.

6. In a generating system as defined in claim 4 wherein said system includes a voltage regulator for regulating the output of said generating machine by controlling the current in said field winding in response to said output, said regulating means switching off and on as the output of said generating machine rises and falls to predetermined levels to provide said current which pulses in a predetermined manner.

7. In a generating system as defined in claim 1 wherein said third means comprises a saturating winding for said transformer and circuit means connecting said saturating winding across the battery terminals of said battery, said circuit means including uni-directional conducting means for blocking current flow in said saturating winding when said battery is connected to the battery terminals with proper polarity and whereby said circuit means is conductive when said battery is inserted with reverse polarity to saturate said transformer.

8. In a generating system as defined in claim 7 wherein said switching means is a controlled rectifier and said secondary winding is connected to provide gate signals to said rectifier.

9. In a generating system as defined in claim 7 wherein said machine is a generating machine for generating a direct current and said primary winding is connected into the field circuit of said generating machine.

10. In a generating system as defined in claim 9 wherein said switching means is a controlled rectifier and said secondary winding is connected to provide gate signals to said rectifier.

11. In a generating system as defined in claim 9 wherein said generating system includes voltage regulating machine responsive to the output of said generating means for controlling the field current in said field winding, said voltage regulating means switching said field current off and on as the output of said generating machine rises and falls to predetermined levels to provide said current which pulses in a predetermined manner.

12. In a generating system, generating means to be connected to supply direct current to charge a battery, said generating means having a field circuit comprising a field winding, load conductors connecting the output of said generating means to said battery, switching means in said load conductors for connecting and disconnecting the output of said generating means to and from said battery, means for sensing current in said field circuit, and means responsive to the last said means for supplying a signal to said switching means to activate the latter to connect the generating means to said battery when the generating means has started.

13. In a generating system as defined in claim 12 wherein said means for sensing current in said field circuit comprises a circuit element connected in series with said field winding.

14. In a generating system as defined in claim 12 in which said generating system includes means responsive to the polarity of said battery for inhibiting the activation of said switching means in response to said means for sensing current in said field.

15. In a generating system as defined in claim 14 wherein said switching means comprises a controlled rectifier having its anode connected to the positive side of said generating means.

* * * * *